United States Patent
Glownia et al.

(10) Patent No.: US 6,485,599 B1
(45) Date of Patent: Nov. 26, 2002

(54) CURING OF SEALANTS USING MULTIPLE FREQUENCIES OF RADIATION

(75) Inventors: James H. Glownia, Somers, NY (US); Robert J. von Gutfeld, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 09/614,056

(22) Filed: Jul. 11, 2000

(51) Int. Cl.$^7$ .............................................. B32B 31/26
(52) U.S. Cl. ................. 156/272.8; 156/379.6; 156/275.5; 359/238; 359/298; 359/329; 372/22; 372/24
(58) Field of Search .......................... 156/272.8, 379.6, 156/275.5; 445/25; 372/22, 24; 359/238, 240, 298, 328, 329; 349/190, 122

(56) References Cited

U.S. PATENT DOCUMENTS

| | | | |
|---|---|---|---|
| 5,263,888 A | | 11/1993 | Ishihara et al. |
| 5,325,381 A | * | 6/1994 | Paoli .......................... 359/204 |
| 6,179,679 B1 | | 1/2001 | Von Gutfeld et al. |
| 6,347,102 B1 | * | 2/2002 | Konno et al. ................. 372/10 |

* cited by examiner

Primary Examiner—Michael W. Ball
Assistant Examiner—John T. Haran
(74) Attorney, Agent, or Firm—Casey P. August; Jon A. Gibbons; Fleit, Kain, Gibbons, Gutman & Bongini P.L.

(57) ABSTRACT

A system using several wavelengths, preferably from the output of a single laser, is described for curing a dual cure glue seal that affixes two substrates to form a liquid crystal display panel. Here the liquid crystal is already in place before the glue seal is cured so that a high temperature bake to promote the sealant curing is not permissible . The multiple wavelengths from the single source of radiation result both from frequency doubling and mixing of the fundamental laser to achieve frequency tripling. Generally a UV wavelength is required for curing the photolytic component of the glue seal so that in the present invention the fundamental from a ~1 micron (1000 nm) wavelength laser is frequency tripled. The UV is scanned along the entire peripheral region of the glue seal. The other wavelengths, typically infrared and possibly the first frequency doubled (first harmonic) of the infrared are separately collected and separately scanned only along those regions of the glue seal shadowed by circuit lines. These wavelengths are partially absorbed by the metal lines to cause thermal initiation of the dual component glue seal which is used in such a system.

14 Claims, 3 Drawing Sheets

CURING OF SEALANTS USING MULTIPLE FREQUENCIES OF RADIATION

FIELD OF INVENTION

The present invention relates to a system for scanning a target with multiple frequencies of radiation, preferably to enhance the curing of a polymer that is otherwise prevented from receiving direct radiation for photolytic curing due to shadowing.

The shadowing phenomenon occurs when metallization or other opaque structures come between the incident radiation and the polymer to be cured. The inability for the radiation, usually in the form of UV light to reach the polymer, prevents photoinitiators from being activated that normally lead to the polymerization of a photosensitive polymer. This type of problem is especially important in certain types of liquid crystal panel manufacturing where section of glue seal are not accessible to the radiation that affixes the substrates comprising the panel due to certain input/output lines that are deposited in a region directly over the glue seal. In the case of liquid crystal displays, this uncured polymer in the form of a glue seal can lead to contamination of the liquid crystal and a degradation of the panel performance over time.

Alternative methods for curing of sealants are disclosed in U.S. patent appl. Ser. No. 09/425,701 and 09/425,711, both filed on Oct. 22, 1999 in the names of Glownia et al.

BACKGROUND OF THE INVENTION

One method presently used to cure the polymeric glue that affixes the two substrates that form a liquid crystal display panel is the use of UV radiation to create free radicals that act as photoinitiators in the glue to cause the glue to polymerize or cure. It has been found that any uncured or partially cured glue along the sealant region can cause serious contamination of the liquid crystal leading to long term degradation of the panel's performance. In the heretofore standard manufacturing process of liquid crystal displays, the two substrates that form the panel are affixed by curing a thermally setting glue at a temperature well above that which the liquid crystal can withstand. This is possible because the liquid crystal is drawn into the panel after the thermal cure step has taken place.

A recently described and preferred panel manufacturing process utilizes the so called 'one drop fill' or 'ODF' method, patented by Matsushita (U.S. Pat. No. 5263888, issued Nov. 23, 1993, entitled, "Method of Manufacture of Liquid Crystal Display Panel"). Here, the liquid crystal is deposited in droplets on one substrate of the two substrates comprising the liquid crystal panel. A narrow fillet of glue seal defines the outer periphery of the liquid crystal material and the second substrate is aligned and placed over the first substrate. At this stage the glue is not polymerized. The conventional oven thermal process to cure or polymerize the glue seal is generally not applicable since the cure temperatures would be detrimental to the liquid crystal now already in place between the two substrates. Instead of thermal curing, a sealant is chosen that polymerizes and cures by way of photoinitiating radicals, rather than by thermal initiators.

The photocuring prevents overheating of the liquid crystal material in contact with the glue seal. To produce the photo-initiated cure reaction, a UV light source is generally used. The problem with this curing process is that the panel contains thin film metal data and gate lines that extend along selected positions from the outer periphery or glue seal region of the panel to the interior of the panel. These signal lines prevent incident UV radiation from reaching the glue seal directly underneath these optically opaque regions leaving the possibility of glue that has not been fully cured. Any glue not fully cured underneath the optically opaque data and gate lines can result in contamination of the liquid crystal material leading to a degradation of panel performance. The contamination is likely caused by the uncured glue that leaches into the liquid crystal region over time.

OBJECTS OF THE INVENTION

The present invention simultaneously utilizes several radiation frequencies or wavelengths, separately scanned over portions near the periphery of the panel to overcome the problem of shadowing. In our sealing process different frequencies of the radiation source are used to generate both a photolytic and a thermal reaction, preferably though not necessarily of a dual cure glue seal. The thermal reactions initiated by some portion of the energy available from the radiation source are scanned independently over the regions where shadowing would normally occur. The object is to cure the glue seal with the liquid crystal in place without overheating or degrading the liquid crystal while providing the radiation necessary to react all the glue seal to at least a partial if not a fully polymerized or cured state.

To overcome this problem the aforementioned shadowing problem, our invention in its preferred embodiment uses a high repetition rate pulsed laser with non-linear elements to obtain several frequencies (wavelengths) of radiation. A dual cure glue seal,that is one that cures both thermally and photolytically, is preferably used for the sealant, . UV radiation is commonly used to activate the photolytic reaction while in the present invention, other wavelengths, typically in the visible and the infrared are used to provide local heat in the form of short pulses absorbed by the opaque shadowing patterns. The local heat serves to initiate thermal curing and also lower the viscosity of the glue seal to enhance diffusion of the photoinitiators into the shadowed regions, photoinitiators created by the incident UV light in the regions adjacent to the shadowed areas.

SUMMARY OF THE INVENTION

The present invention utilizes two or more monochromatic sources of electromagnetic radiation, with each source of radiation having a different fundamental frequency. These sources or electromagnetic radiation are directed onto a target and scanned along certain paths of the target. The purpose of this scanning may for example be to create photoinitiators which chemically start to cure a polymer that is used to affix two substrates to one another, the substrates forming the aforementioned target.

The sources of radiation, each having different fundamental wavelengths (frequencies) may also be obtained from a single monochromatic source from which different wavelengths can be obtained by using of a non-linear element such as a frequency doubler. The output of the doubling frequency may again be mixed with a second non-linear element to result in a total of three electromagnetic radiation frequencies, that is the fundamental, the fist doubled fundamental, and the a tripled fundamental or fundamental, first and second harmonics. The radiation output at different wavelengths (frequencies) can be spatially separated using, for example, one or more dichroic mirrors or a system of prisms. The separated electromagnetic radiation at the three different wavelengths (frequencies) can then be independently scanned for example by a set of scanning mirrors or optical fibers and the scanned radiation directed onto a target. The target may preferably consist of a pair of substrates that form a liquid crystal display panel. The sources of radiation need not necessarily be monochromatic in which case there is more than one fundamental wavelength (frequency) present for each source. However, for the present application it is preferred to choose the strongest of the multi-line wavelengths (frequencies) for the wavelength doubling and tripling to obtain the strongest possible output of electromagnetic radiation.

A typical source of monochromatic electromagnetic radiation suitable for the present invention is a laser since both cw and pulsed lasers generally produce electromagnetic radiation with a strong dominant or main fundamental wavelength which can readily be doubled and tripled. For cases where the electromagnetic radiation is to be used to cure a glue seal, ultraviolet wavelengths are often required. Thus, if the tripled wavelength electromagnetic radiation is to be in the wavelength range of 300–400 nm, it is convenient to use a laser whose fundamental wavelength is less than approximately 1.5 microns (1500 nm). $Nd^{3+}$-YAG or $Nd^{3+}$-YLF lasers are well suited in that each possess a fundamental electromagnetic radiation wavelength (frequency) that can readily be doubled and tripled. The tripled wavelength (frequency) is in the ultraviolet region and well suited to cure or polymerize the glue seal used to affix the substrates comprising a flat panel display while the fundamental and first doubled wavelength, respectively in the infrared and green-blue region, can be directed to portions on the target that are partially blocked or shadowed by opaque regions on the substrate. While the infrared and blue-green electromagnetic radiation generally cannot polymerize the glue seal, it serves to heat the glue seal beneath the shadowed region. The heating causes a rise in temperature through absorption of the incident radiation by the opaque or partially opaque regions. This temperature rise makes it more likely for the excited radicals formed by the tripled radiation to diffuse underneath the shadowed region to provide a means for curing the shadowed glue seal. These wavelengths (the fundamental and the doubled wavelengths) can be preferably scanned by independent scanning means over relatively short peripheral regions joining the two substrates that are opaque during the time that the ultraviolet or tripled wavelength radiation scans by independently operated scanning means the entire periphery of the two substrates that form the liquid crystal panel. Throughout the discussion the preferred embodiment is that of a liquid crystal, although to those skilled in the art it will be apparent that this is just one example for which the invention is applicable.

DETAILED DESCRIPTION OF THE INVENTION

Figure 1A:
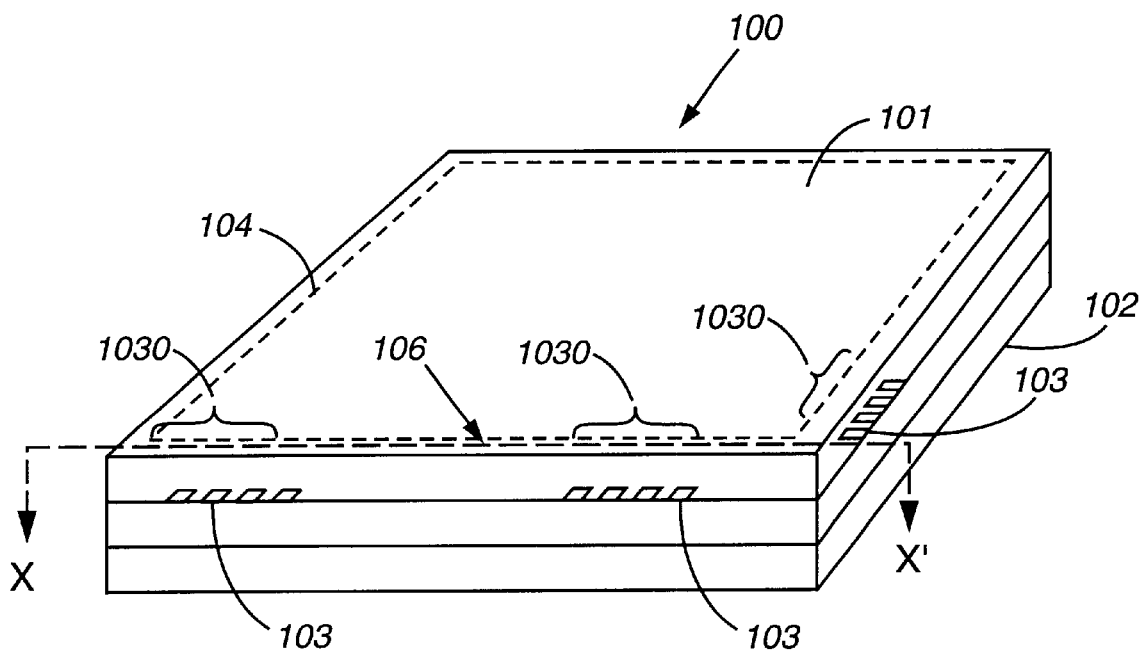
FIG. 1a shows a schematic view of two substrates joined along a mutually peripheral region and affixed to one another. The substrates form a liquid crystal panel with selected peripheral portions that are metallized and therefore opaque to incident radiation.
Figure 1B:
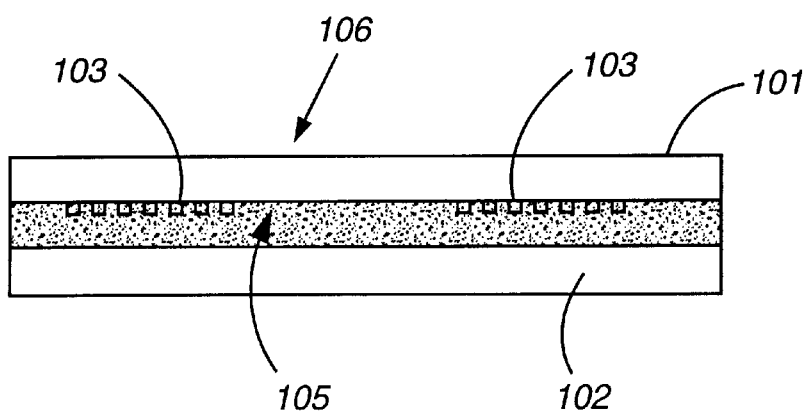
FIG. 1b is a section along A—A of the panel of FIG. 1a showing the region that contains both the glue seal and the data/gate lines.

The present invention solves the general problem that arises when a typical polymeric sealant is used to affix two substrates which represent the target herein, to one another along or near their periphery when 1) there is material contained in a space between the two substrates, interior to the polymeric sealant, 2) said material is temperature sensitive and 3) the polymeric material requires curing or polymerization but the periphery or "mutual peripheral region" has selected positions which cannot be directly accessed by incident radiation due to opaque regions between the substrate and the polymer. In the present embodiment, the preferred target is a liquid crystal panel display made by the one drop fill method first described by Matsushita and referenced above. The one drop fill (ODF) process requires a predetermined precise quantity of liquid crystal deposited onto one of the two substrates prior to affixing and sealing the second substrate to the first. After the two substrates are loosely joined, the peripherally pre-deposited glue seal is cured photolytically, generally with the aid of a UV radiation source. This ODF process differs substantially from the conventional panel assembly process where the two substrates are first permanently affixed by baking a thermally sensitive glue disposed along the periphery between the two substrates, at a relatively high temperature for periods of 1–3 hours, typically 180C. In this earlier manufacturing process the substrate assembly is then placed in a vacuum chamber, dipped into a container of liquid crystal which then gets drawn into a narrow space between the affixed substrates. However, for the one drop fill process, this baking process cannot be used since the liquid crystal cannot withstand temperatures much above 120C. FIG. 1a) shows a schematic of a target panel 100 comprised of two substrates 101 and 102. Shown also are the metal data/gate lines 103 along selected positions 1030 on portions of the periphery 104 of substrate 100. The data/gate lines 103 are opaque to the transmission of laser radiation and therefore cannot reach the glue seal 105 positioned underneath metallization 103. Glue seal 105 is deposited near an outer edge along the entire periphery to affix the two substrates to one another. Liquid crystal 106 is located between substrates 101 and 102 interior to the polymer glue sealant 105. A more detailed view of a section of the panel is shown in FIG. 1b) to emphasize the selected positions and details of metal lines 103 which are opaque to the available incident radiation. Thus, any UV radiation incident on that region of the panel will not penetrate lines 103 to the glue seal 105 below so that those portions of the glue seal will not be photolytically activated and hence remain uncured.

To overcome this problem, the present invention preferably uses a dual cure glue, that is one that can be activated to cure either by photolytic or thermal excitation. It is important to bring about curing of glue seal 105 in a manner that prevents contamination or intermixing of the glue seal 105 and the liquid crystal 106. For that reason a pulsed laser with pulses widths on the order of 10–1000 ns is most suitable though the pulse width need not be limited to that range.

Figure 2:
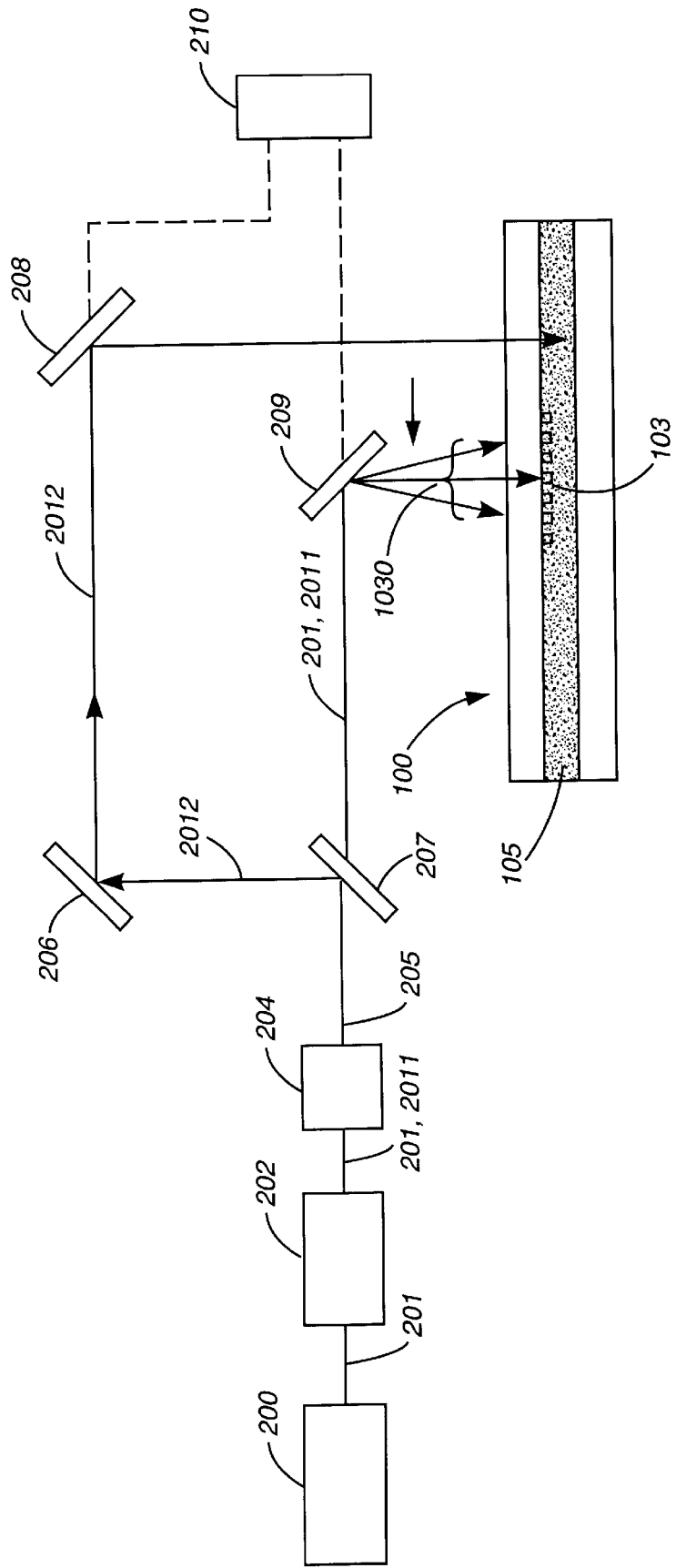
FIG. 2 is a schematic view of a system according to the invention, comprising a laser capable of delivering several wavelengths (frequencies) of light through the use of non-linear mixing crystals along with scanning mirrors that scan independently at differing scan rates, to deliver two or more frequencies to select portions of the panel under which there is glue seal that needs to be cured photolytically or thermally due to shadowing.

In general, several sources of radiation, (each of which may be a pulsed monochromatic source )can be used to irradiate different regions of the periphery 104 to help overcome the shadowing problem. Shown in FIG. 2 is a monochromatic source (i.e. a laser 200) capable of producing several wavelengths of radiation by way of well known mixing and harmonic generation techniques. In particular, the light source in a preferred embodiment is a $Nd^{3+}$: YLF (neodymium yttrium lithium fluoride) laser. The laser frequency is preferably less than 1500 nm. For example, frequency 201 at a wavelength of 1047 nm is frequency doubled by a nonlinear element such as a doubling crystal 202 to form radiation 2011 at a wavelength of 524 nm (corresponding to twice the fundamental frequency). Crystal 202 may consist of potassium di-hydrogen phosphate (KDP), a typical nonlinear doubling crystal. The laser radiation output from crystal 202 will contain components of light at both the fundamental infrared frequency 201 (wavelength at 1057 nm) and the first doubled fundamental frequency or first harmonic 2011 (wavelength at 524 nm), that is components of radiation at both wavelengths 201 and 2011.

Radiation beams 201 and 2011 pass through a second nonlinear element commonly referred to as a mixing crystal 204 which may again be a crystal such as KDP to generate the UV wavelength 2012 at 349 nm (the second harmonic or second doubled fundamental frequency). The light output 205 exiting crystal 204 now comprises three frequencies, the fundamental 201 at 1047 nm, the doubled fundamental 2011 (524 nm) and the tripled fundamental frequency, a UV component 2012 at 349 nm.

Two dichroic mirrors, 206, 207 serve as independent separating members, which separate the UV radiation.

FIG. 2 shows two independent scanning means in the form of mirrors 208, 209.

The slow scan will raise the temperature locally without substantial lateral thermal spread to liquid crystal 106 which must be kept below ~125C in order for liquid crystal 106 to remain functional. We have calculated the lateral heat spread for laser pulse widths on the order of 10's of nanoseconds such as is the case for the $Nd^{+3}$:YLF laser 200 and found it to be only several microns in distance. It can also be shown using the theory of L. T. Pittaway (Brit. J. Appl. Phys. 15, 967 (1964)), that the local temperature rise of the molybdenum metal line 103 for a single 20 ns pulse, (assuming ~50% optical absorption of the incident radiation) is on the order of 400C for a 1 mJ pulse focused to a radius on the target 103 of 1 mm. The thermal decay to near ambient takes on the order of a 0.1 ms. Therefore, with a high repetition rate (5–10 kHz), the radiation from the relatively slow scan rate of mirror 209 can cause a substantial temperature rise for short times to initiate a thermal cure of sealant 105 while also lowering the viscosity of 105 due to the increased temperature. The tripled frequency radiation 2012 is used to initiate the photolytic cure in target regions 301 not shadowed by 103. Thus the combination of the two mirrors 208 and 209, separately programmed to scan at different rates bring about an adequate curing of glue seal 106 to prevent glue-liquid crystal contamination. It should be noted that while the particular laser described, ($Nd^{+3}$:YLF) with its characteristic available wavelengths and pulse duration are presented here as a preferred embodiment, the invention is also operative using different wavelengths that may be available from a single or multiple electromagnetic source with pulse widths that can range from picoseconds to microseconds. In principle even cw radiation sources can be used in the present invention if scanned sufficiently rapidly to prevent lateral heating of the liquid crystal 106. Furthermore, in the most generic embodiment, the different wavelengths can come from more than one source of radiation so long as the radiation is sufficiently intense even if the sources have several frequencies of radiation. Under those circumstances at least one of the multi-line frequencies has to be sufficiently intense to achieve the polymerization of glue seal 105 in a time scale compatible with the desired manufacturing throughput to be effective.

Figure 3:
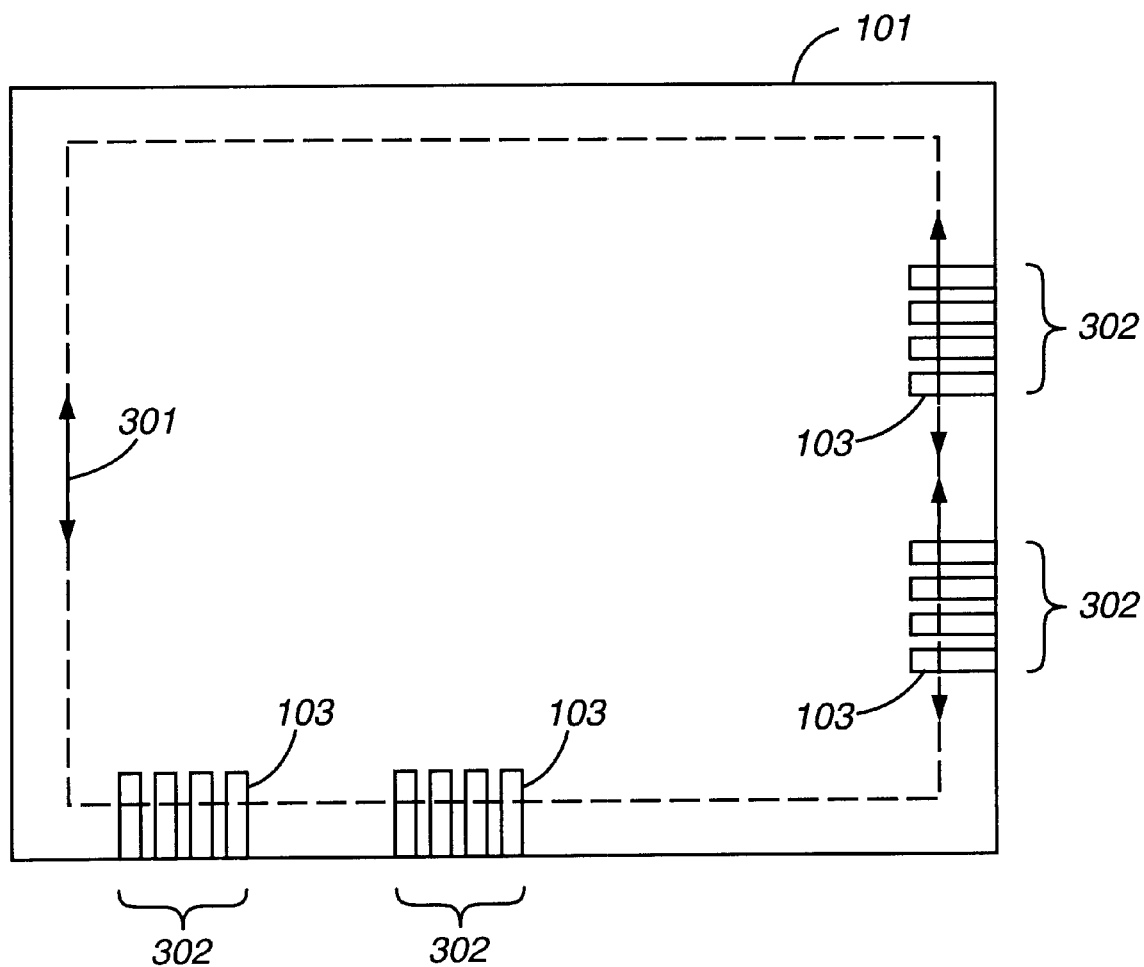
FIG. 3 shows the trajectories of each of the two scanned beams of radiation traversing the peripheral region of the panel of FIG. 2 in order to bring about the cure of the glue seal.

FIGS. 3 shows the electromagnetic radiation or light beam trajectories 301 and 302 incident on substrate 101. Trajectory 301 results from the programmed scan of mirror 208 while trajectory 302 results from the programmed scan of mirror 209, each controlled by computer 210.

As shown, mirror trajectory 301 is used to scan the entire periphery in the region of the glue seal while trajectories 302 traced by scanning mirror 209 are limited to oscillate about small regions above the metallized signal/gate lines 302.

It will be clear to those skilled in the art that the invention is not restricted to any particular type of laser or scanning means for obtaining the desired localized heating for curing shadowed glue seals while a second laser frequency of radiation scans a broader region, that is not necessarily opaque to the incident radiation, also for glue seal curing.

What is claimed is:

1. A substrate joining system for joining two substrates of a target with a sealant along a mutual peripheral region comprising:
   a monochromatic source of electromagnetic radiation at a fundamental frequency;
   a first nonlinear element for doubling said fundamental frequency of said electromagnetic radiation;
   a second nonlinear element for tripling said fundamental frequency of said electromagnetic radiation;
   at least two independent separating means for spatially separating radiation or said fundamental frequency from radiation of the doubled fundamental frequency and from radiation of the tripled fundamental frequency; and
   at least two independent scanning means for independently directing and controlling the movement of radiation of said fundamental, said doubled fundamental frequency and said tripled fundamental frequency to said mutal peripheral region to cure the sealant and thereby join the two subsrates of the target.

2. A substrate joining system as in claim 1 wherein each said independent separating means comprises a dichroic mirror.

3. A substrate joining system as in claim 1 where each said independent scanning means comprises at least one scanning mirror.

4. A substrate joining system as in claim 1 where said monochromatic source is a pulsed laser.

5. A substrate joining system as in claim 4 where said fundamental electromagnetic frequency of said pulsed laser corresponds to a wavelength less than 1500 nm.

6. A substrate joining system as in claim 4 where said pulsed laser is a $Nd^{3+}$-YAG laser.

7. A substrate joining system as in claim 4 where said pulsed laser is a $Nd^{3+}$-YLF laser.

8. A substrate joining system as in claim 1 wherein said fundamental radiation and said tripled fundamental frequencies of radiation correspond respectively to radiation in the near infrared and ultraviolet regions of the electromagnetic spectrum.

9. A substrate joining system as in claim 1 wherein one independent scanning means is operable to scan said mutual peripheral region with radiation of the tripled fundamental frequency.

10. A substrate joining system as in claim 9, wherein another independent scanning means is operable to scan selected position of said mutual peripheral region with radiation of said fundamental frequency and said doubled fundamental frequency, and wherein a dual cure sealant is disposed at said selected position.

11. A substrate joining system as in claim 10 wherein at least a portion of said selected position exhibits a rise temperature from radiation directed thereat.

12. A substrate joining system as in claim 11 where said radiation of fundamental and doubled fundamental frequencies is scanned over said selected position while said radiation of tripled fundamental frequency is scanned over all of said mutual peripheral region of said target.

13. A substrate joining system as in claim 1 where said target comprises a liquid crystal display.

14. A method for joining two substrates of a target with a sealant along a mutual peripheral region comprising:

emitting electromagnetic radiation at a fundamental frequency, by a monochromatic source of electromagnetic radiation;

doubling, by a first nonlinear element, said fundamental frequency of said electromagnetic radiation;

tripling, by a second nonlinear element, said fundamental frequency of said electromagnetic radiation;

spatially separating, by at least two independent separating means, radiation of said fundamental frequency from radiation of the doubled fundamental frequency and from radiation of the triples fundamental frequency; and independently directing and controlling, by at least two independent scanning means, the movement of radiation of said fundamental, said doubled fundamental frequency and said tripled fundamental frequency to said mutual peripheral region to cure the sealant and thereby join the two substrates of the target.

* * * * *